(12) United States Patent
Kim (10) Patent No.: US 11,760,367 B2
(45) Date of Patent: Sep. 19, 2023

(54) SYSTEM FOR CONTROLLING FAILURE OF ENVIRONMENT-FRIENDLY VEHICLE

(71) Applicants: Hyundai Motor Company, Seoul (KR); Kia Corporation, Seoul (KR)

(72) Inventor: Joo Beom Kim, Gyeongsangbuk-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 36 days.

(21) Appl. No.: 17/499,189

(22) Filed: Oct. 12, 2021

(65) Prior Publication Data
US 2022/0234600 A1 Jul. 28, 2022

(30) Foreign Application Priority Data
Jan. 25, 2021 (KR) ........................ 10-2021-0010272

(51) Int. Cl.
*B60W 50/02* (2012.01)
*B60W 50/029* (2012.01)
(Continued)

(52) U.S. Cl.
CPC ...... *B60W 50/0205* (2013.01); *B60W 30/143* (2013.01); *B60W 50/029* (2013.01);
(Continued)

(58) Field of Classification Search
CPC ........... B60W 50/0205; B60W 30/143; B60W 50/029; B60W 50/14; B60W 2050/021; B60W 2050/0297; B60W 2510/10; B60W 2710/081; B60W 2710/186; B60W 2050/0215; B60W 2520/10; B60W 10/10; B60W 10/18; B60W 10/182; B60W 30/18127; B60W 2520/14; B60W 2520/28; B60W 10/08; B60W 60/0015; B60W 50/0098; B60W 30/18054; B60W 40/105; B60T 13/00; B60T 13/74; B60T 17/221;
(Continued)

(56) References Cited
U.S. PATENT DOCUMENTS

10,647,311 B2 * 5/2020 Chuang .................... B60T 13/66
11,548,526 B2 * 1/2023 Batts ........................ B60Q 1/46
(Continued)

*Primary Examiner* — Sze-Hon Kong
(74) *Attorney, Agent, or Firm* — Fox Rothschild LLP (57) ABSTRACT

A system for controlling a failure of an environment-friendly vehicle is provided to which a highway driving pilot (HDP) system is applied. The system includes a vehicle control unit (VCU) controller that operates a driving motor, an integrated electric booster (IEB) controller that operates IEB for controlling a brake of the environment-friendly vehicle and generate a request to the VCU controller for regenerative braking, and an HDP controller that calculates a required deceleration of the environment-friendly vehicle based on the situation around the environment-friendly vehicle, determined through cognitive control sensors applied to the environment-friendly vehicle. The HDP controller transmits the required deceleration to the IEB controller. At least one of regenerative braking of the driving motor or braking through the brake is performed based on a type of a fault message output by the IEB controller or a failure in communication between the HDP controller and the IEB controller.

15 Claims, 6 Drawing Sheets

(51) Int. Cl.
  *B60W 50/14* (2020.01)
  *B60W 30/14* (2006.01)

(52) U.S. Cl.
  CPC ....... *B60W 50/14* (2013.01); *B60W 2050/021* (2013.01); *B60W 2050/0297* (2013.01); *B60W 2510/10* (2013.01); *B60W 2710/081* (2013.01); *B60W 2710/186* (2013.01)

(58) Field of Classification Search
  CPC ..... B60T 2270/60; Y02T 90/16; B60K 35/00; B60K 2370/152; G05D 1/0055; G05D 2201/0213; B60Y 2300/1805; B60Y 2300/18125; B60Y 2306/15; B60Y 2400/3032; B60Y 2400/304
  See application file for complete search history.

(56) References Cited

U.S. PATENT DOCUMENTS

| | | | | |
|---|---|---|---|---|
| 2006/0163939 A1* | 7/2006 | Kuramochi | ............ | B60T 8/885 303/122.04 |
| 2010/0198473 A1* | 8/2010 | Strengert | ............ | B60T 17/221 701/70 |
| 2015/0158499 A1* | 6/2015 | Koravadi | ............ | B60T 7/12 701/1 |
| 2018/0029577 A1* | 2/2018 | Beauvais | ............ | B60T 8/176 |
| 2019/0118827 A1* | 4/2019 | Khalifeh | ............ | B60W 50/029 |
| 2019/0135258 A1* | 5/2019 | Chuang | ............ | B60L 7/26 |
| 2019/0333291 A1* | 10/2019 | Liu | ............ | G06F 16/00 |
| 2019/0359222 A1* | 11/2019 | Huang | ............ | G05D 1/0088 |
| 2020/0254988 A1* | 8/2020 | Di Stefano | ............ | B60T 8/17 |
| 2020/0307631 A1* | 10/2020 | Tsuji | ............ | B60Q 1/48 |
| 2020/0324744 A1* | 10/2020 | Mizusaki | ............ | B60T 13/686 |
| 2021/0122343 A1* | 4/2021 | Mehdizade | ............ | B60T 8/94 |
| 2021/0270363 A1* | 9/2021 | Tomita | ............ | F16H 63/3483 |
| 2021/0300349 A1* | 9/2021 | Hara | ............ | B60W 10/20 |
| 2021/0300392 A1* | 9/2021 | Shionome | ............ | B60R 16/0232 |
| 2022/0009486 A1* | 1/2022 | Sakashita | ............ | B60W 40/02 |
| 2022/0153244 A1* | 5/2022 | Nakayama | ............ | B60T 8/17558 |
| 2022/0161772 A1* | 5/2022 | Mazzoleni | ............ | B60T 13/745 |
| 2022/0176992 A1* | 6/2022 | Nemoto | ............ | B60W 60/007 |
| 2022/0219656 A1* | 7/2022 | Asano | ............ | B60T 8/1761 |
| 2022/0250600 A1* | 8/2022 | Leiber | ............ | B60T 13/142 |
| 2022/0324438 A1* | 10/2022 | Liu | ............ | B60W 50/14 |
| 2022/0348183 A1* | 11/2022 | Malone | ............ | B60W 10/18 |
| 2022/0371561 A1* | 11/2022 | Brenn | ............ | B60T 13/741 |

* cited by examiner

SYSTEM FOR CONTROLLING FAILURE OF ENVIRONMENT-FRIENDLY VEHICLE

CROSS-REFERENCE TO RELATED APPLICATION

This application claims under 35 U.S.C. § 119(a) the benefit of priority to Korean Patent Application No. 10-2021-0010272 filed on Jan. 25, 2021, the entire contents of which are incorporated herein by reference.

BACKGROUND

(a) Technical Field

The present disclosure relates to a system for controlling a failure of an environment-friendly vehicle for performing minimum-risk maneuver (MRM) control for ensuring stability when a failure occurs in the environment-friendly vehicle.

(b) Background Art

Recently, interest in autonomous vehicles has increased and technologies therefor have been actively developed. To apply fully autonomous vehicles, relevant laws and regulations, societal acceptance, and satisfactory performance of the vehicles are all required, and accordingly the application of fully autonomous vehicles has been approached very carefully. The safety of a device installed in a vehicle to be prepared for failures and accidents that occur during autonomous driving of the vehicle is an important factor in commercialization of autonomous vehicles.

A technology at Level 3, among levels of autonomous driving technologies, provides conditional automation. A conditional automation system is configured to alert a driver when a vehicle failure occurs and to transfer control of the vehicle to the driver in the case of an emergency. However, a driver of a vehicle at Level 3, who usually neglects to look forward while the vehicle is being driven, is not capable of immediately responding in the case of an emergency of the vehicle, and the stability of the vehicle needs to be ensured before control is transferred to the driver. Accordingly, controllers installed in the vehicle need to establish an optimal strategy for ensuring the stability of the vehicle.

However, there has been no specific alternative for an optimal braking control strategy between controllers in various failure scenarios such as a failure of a brake and a controller for controlling the same, or a failure in communication between the controllers. In particular, in the case of a failure related to a brake that performs direct braking, a specific method is not discussed for a control strategy for braking between controllers.

SUMMARY

In one aspect, the present disclosure provides a system for controlling a failure of an environment-friendly vehicle for ensuring the stability of a vehicle by ensuring braking of the environment-friendly vehicle even during various failure situations such as a failure of a brake, a failure of an integrated electric booster (IEB), and a failure in communication.

An embodiment of the present disclosure provides a system for controlling a failure of an environment-friendly vehicle. A system for controlling a failure of an environment-friendly vehicle to which a highway driving pilot (HDP) system is applied may include a vehicle control unit (VCU) controller configured to operate a driving motor, an integrated electric booster (IEB) controller configured to operate an IEB for controlling a brake of the environment-friendly vehicle and to generate a request to the VCU controller for regenerative braking, and an HDP controller configured to calculate a required deceleration of the environment-friendly vehicle based on a situation around the environment-friendly vehicle, determined through cognitive control sensors applied to the environment-friendly vehicle, and to transmit the required deceleration to the IEB controller, wherein at least one of regenerative braking of the driving motor or braking through the brake is performed based on a type of a fault message output by the IEB controller or a failure in communication between the HDP controller and the IEB controller.

According to an embodiment, the HDP controller may be configured to determine a type of failure of the IEB based on the type of the fault message received from the IEB controller, and the IEB controller may be configured to determine the type of failure of the IEB based on the type of the fault message transmitted to the HDP controller.

Additionally, the IEB controller may be configured to transmit the fault message to the HDP controller, the fault message may include a first fault message, indicating that a failure occurs in a vehicle sensor that transmits data to the IEB controller, and a second fault message, indicating a type of failure in which it becomes impossible to control the brake, and the vehicle sensor may include a yaw rate sensor, a wheel speed sensor, and an acceleration sensor. When the IEB controller outputs the first fault message, the IEB controller may be configured to transmit a regenerative braking amount of the driving motor, derived based on the required deceleration, to the VCU controller and operate the IEB to thus operate the brake.

According to an embodiment, when the IEB controller outputs the second fault message, the IEB controller may be configured to check whether it is possible for the IEB controller and the VCU controller to communicate with each other, and the VCU controller may be configured to check whether it is possible to perform regenerative braking through the driving motor. In response to determining that it is possible for the IEB controller and the VCU controller to communicate with each other and it is possible to perform regenerative braking through the driving motor, the IEB controller may be configured to transmit a regenerative braking amount of the driving motor, derived based on the required deceleration, to the VCU controller.

After the environment-friendly vehicle is stopped, the IEB controller may be configured to operate an electric parking brake (EPB). When a failure occurs in communication between the IEB controller and the HDP controller, the IEB controller may be configured to perform braking of the environment-friendly vehicle through the brake based on a preset braking amount.

According to an embodiment, when a failure of the IEB is a failure in which it is impossible to control the brake or a failure occurs in communication between the IEB controller and the HDP controller, the HDP controller may be configured to determine whether to perform minimum-risk maneuver (MRM) control for minimizing risk of driving of the environment-friendly vehicle of the IEB based on a deceleration of the environment-friendly vehicle. The HDP controller may fix the required deceleration to a specific deceleration. In addition, the HDP controller may be configured to request a cluster installed in the environment-friendly vehicle to output a warning message to a driver.

The HDP controller may further be configured to determine whether the environment-friendly vehicle decelerates or accelerates using an acceleration sensor applied to the environment-friendly vehicle, and when the environment-friendly vehicle accelerates or the deceleration of the environment-friendly vehicle is outside a preset range, the HDP controller may be configured to directly transmit the required deceleration to the VCU controller. When the deceleration of the environment-friendly vehicle is within the preset range, the HDP controller may be configured to recognize that control of braking of the environment-friendly vehicle is performed by at least one of the IEB controller or the VCU controller.

Further, the VCU controller may be configured to calculate a regenerative braking amount of the driving motor based on the required deceleration received from the HDP controller and operate the driving motor based on the calculated regenerative braking amount. The HDP controller may be configured to determine whether the environment-friendly vehicle is stopped based on the deceleration of the environment-friendly vehicle, acquired through the acceleration sensor, and the HDP controller may be configured to request the VCU controller to shift a gear stage to a park (P) stage when the environment-friendly vehicle is stopped. According to an embodiment, in response to receiving a signal indicating that the gear stage is shifted to the P stage, the HDP controller may be configured to stop transmitting the required deceleration to the VCU controller.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

The attached drawings for illustrating exemplary embodiments of the present disclosure are to be referred to in order to gain a sufficient understanding of the present disclosure, the merits thereof, and the objectives accomplished by the implementation of the present disclosure. The present disclosure may, however, be embodied in many different forms, and should not be construed as being limited to the embodiments set forth herein; rather, these embodiments are provided so that this disclosure will be thorough and complete, and will fully convey the concept of the present disclosure to one of ordinary skill in the art. Meanwhile, the terminology used herein is for the purpose of describing particular embodiments and is not intended to limit the present disclosure. Like reference numerals in the drawings denote like elements.

Terms such as 'unit' or 'module', etc., should be understood to indicate units that process at least one function or operation and that may be embodied in a hardware manner, a software manner, or a combination of a hardware manner and a software manner. Terms, such as "first", "second", and the like used in the specification may be used to distinguish the relevant elements using the reference relationship, and are not limited by the order.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The detailed description is used to exemplify the present disclosure. The description herein is given to show exemplary embodiments of the present disclosure, and the present disclosure may be used in various other combinations, changes, and environments. In other words, the present disclosure may be changed or modified within the scope of the concept of the present disclosure disclosed in the specification, the equivalent scope of the given disclosure, and/or the scope of the technology or knowledge in the art. The described embodiment is the ideal embodiment for implementing the technological spirit of the present disclosure, but may be changed in various forms required in detailed applications and use of the present disclosure. Thus, the detailed description of the present disclosure herein is merely exemplary, and is not intended to limit the present disclosure. The following claims are to be interpreted as including other embodiments.

Figure 1:
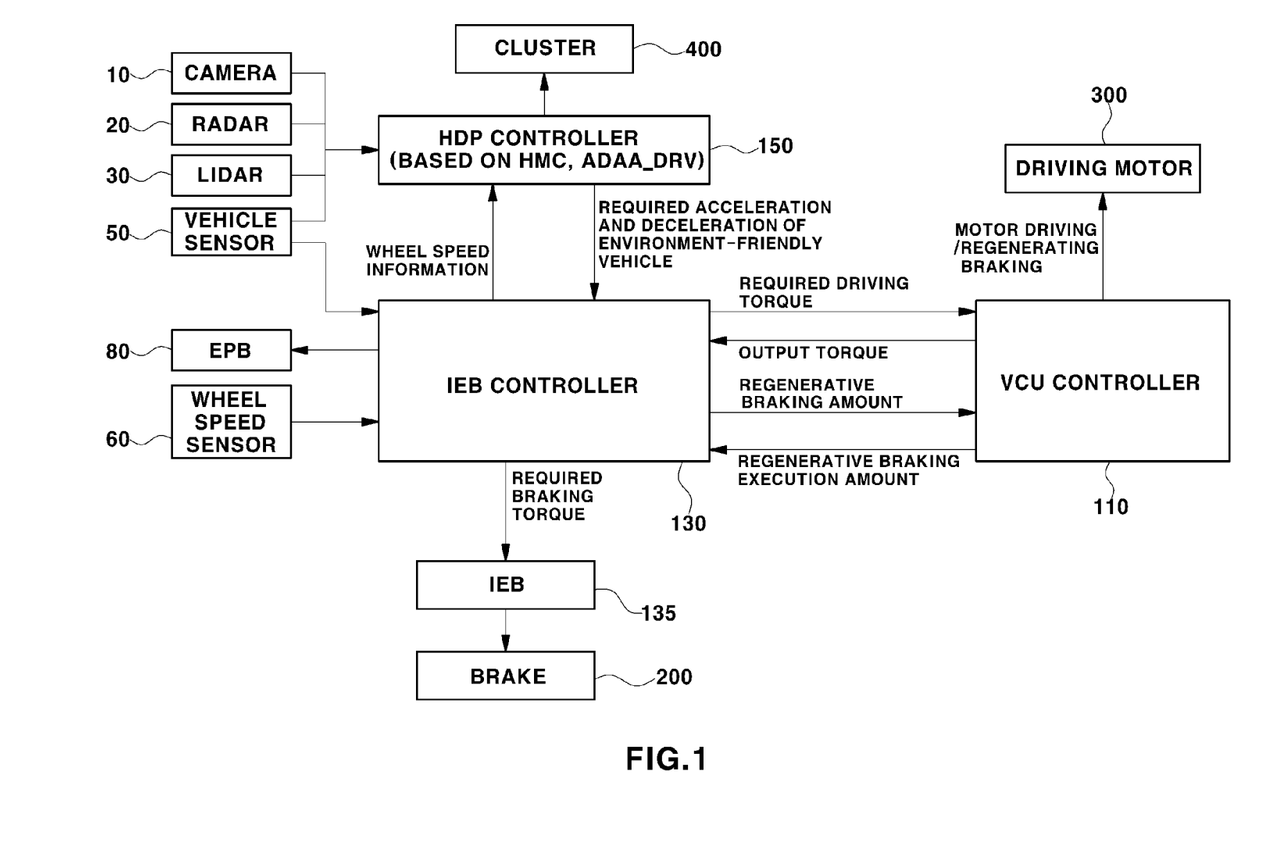
FIG. 1 is a diagram showing a system for controlling a failure of an environment-friendly vehicle according to an embodiment of the present disclosure.

FIG. 1 is a diagram showing a system for controlling a failure of an environment-friendly vehicle according to an embodiment of the present disclosure. Referring to FIG. 1, a failure control system 1 of an environment-friendly vehicle may be embodied by cognitive control sensors 10, 20, and 30 installed in the environment-friendly vehicle, a vehicle sensor 50 installed in the environment-friendly vehicle, a wheel-speed sensor 60, a plurality of controllers 110, 130, and 150, a brake 200, a driving motor 300, and a cluster 400. For example, the environment-friendly vehicle may be a pure electric vehicle (EV) or a fuel cell electric vehicle (FCEV) to which an engine is not applied.

The controllers 110, 130, and 150 may include a vehicle control unit (VCU) controller 110, an integrated electric booster (IEB) controller 130, and a highway driving pilot (HDP) controller 150. According to the present disclosure, the VCU controller 110 may be a controller configured to execute driving and braking of the driving motor 300, the IEB controller 130 may be a controller configured to operate the IEB 135 for directly controlling the brake 200, and the HDP controller 150 may be a controller configured to execute autonomous driving of an environment-friendly vehicle. For example, the HDP controller 150 may be a controller for embodying a driving convenience system that provides a hands-off function for a driver by activating an inter-vehicle distance-keeping function and a lane-keeping function when driving on a highway, driving on a freeway, and low-speed driving.

The cognitive control sensors 10, 20, and 30 may include a camera 10, a radar 20, and a LiDAR 30. The camera 10 may be configured to detect the front, rear, and/or side of the vehicle and transmit the acquired data to the HDP controller 150. The data acquired by the camera 10 may include data on a preceding vehicle, data on the lane ahead, data on a cyclist ahead, data on traffic signs, data on active high beam control (AHBC), data on wheel detection, data on traffic lights, data on road markings (e.g., an arrow on the road), data on a road profile (e.g., data for improving ride comfort through suspension control by recognizing the shape of a road ahead (a curve, a speed bump, or a hole)), data on a semantic free space (e.g., boundary labeling), data on general objects (a vehicle to the side), data on advanced path planning (e.g., data for predicting an expected vehicle travel route through deep learning based on the surrounding environment, even on a road without lane markings or dirty road), data on odometry (e.g., data for recognizing road landmarks and fusing the obtained information with information obtained through GPS), data on a parking line, data on vehicle-to-vehicle clearance for parking, and so on.

The radar 20 may be configured to detect objects in the front, rear, and side areas of the vehicle. The radar 20 may be a sensor device using an electromagnetic wave to measure the distance, speed, or angle of an object. The radar 20 may be configured to detect an object up to about 150 m ahead within a horizontal angular range of about 30 degrees using a frequency modulation carrier wave (FMCW) or pulse carrier method. The data acquired by the radar 20 may be transmitted to the HDP controller 150.

The LiDAR 30 may be configured to detect the front, rear, and side areas of the vehicle. The LiDAR 30 may include a laser transmission module, a laser detection module, a signal collection and processing module, and a data transmission and reception module, and the light source of the laser may be a laser light source having a wavelength or capable of varying a wavelength in a wavelength range of about 250 nm to 11 μm. The LiDAR 30 may be classified into a Time of Flight (ToF) LiDAR and a phase-shift LiDAR depending on a signal modulation method. The data acquired by the LiDAR 30 may be transmitted to the HDP controller 150.

The vehicle sensor 50 may be a sensor configured to detect a driving state of the vehicle. The vehicle sensor 50 may include a yaw rate sensor and an acceleration sensor. The yaw rate sensor may be configured to detect a steering angle at which a steering wheel rotates or detect a yaw rate value at which the vehicle is inclined. The acceleration sensor may include a vertical acceleration sensor and a longitudinal acceleration sensor. The vertical acceleration sensor may be configured to detect a change in a direction perpendicular to the driving direction of the vehicle (i.e., the direction of gravity). The extent of a vertical behavior of the vehicle may be calculated based on the value detected by the vertical acceleration sensor. The longitudinal acceleration sensor may be configured to detect longitudinal acceleration in a forward and backward direction of the vehicle. The value detected by the longitudinal acceleration sensor may be used to determine the presence of an obstacle in front of the vehicle. Thus, deceleration of the environment-friendly vehicle and whether the environment-friendly vehicle is stopped may be recognized using the acceleration sensor.

The wheel-speed sensor 60 may be configured to detect a change in the longitudinal speed of the vehicle. The wheel-speed sensor 60 may be disposed on front and rear wheels of the vehicle. In other words, the wheel-speed sensor 60 may be configured to detect each of a wheel speed of the front wheel and a wheel speed of the rear wheel. The controllers 110, 130, and 150 may be configured to perform minimum-risk maneuver (MRM) control for temporarily controlling the environment-friendly vehicle to minimize the risk of autonomous driving of the environment-friendly vehicle. The controllers 110, 130, and 150 may establish a braking strategy for minimizing the risk of the environment-friendly vehicle by transmitting and receiving data therebetween.

The VCU controller 110 may be configured to adjust acceleration and shifting of the driving motor 300 and perform regenerative braking of the driving motor 300. The IEB controller 130 may be configured to output a required braking torque for operating the IEB 135 for directly controlling the brake 200, and may be configured to output a requirement for regenerative braking. The requirement for regenerative braking may be a regenerative braking amount. The IEB controller 130 may be configured to acquire data from the vehicle sensor 50 and the wheel-speed sensor 60. The IEB controller 130 may be configured to transmit received wheel speed information of the environment-friendly vehicle to the HDP controller 150. The IEB controller 130 may be configured to calculate a required braking torque for braking and a regenerative braking amount for regenerative braking based on a required deceleration of the vehicle, received from the HDP controller 150.

In particular, the IEB controller 130 may be configured to transmit the required braking torque to the IEB 135 and transmit the regenerative braking amount to the VCU controller 110. The VCU controller 110 may be configured to adjust regenerative braking of the driving motor 300 based on the regenerative braking amount received from the IEB controller 130. The VCU controller 110 may be configured to transmit a regenerative braking execution amount, obtained by executing regenerative braking of the driving motor 300 to the IEB controller 130, and transmit an output torque based on driving of the driving motor 300 to the IEB controller 130. The HDP controller 150 may be configured to determine the situation around the environment-friendly vehicle based on data received from the cognitive control sensors 10, 20, and 30 and data received from the vehicle sensor 50, and calculate the required acceleration and deceleration of the vehicle depending on the situation around the vehicle. For example, the HDP controller 150 may be configured to calculate the required deceleration of the vehicle based on a distance from a preceding vehicle, a relative speed, or the like when a collision with the preceding vehicle is expected. The required acceleration and deceleration of the vehicle may be parameters for controlling the behavior of the environment-friendly vehicle.

The IEB controller 130 may be configured to operate an electric parking brake (EPB) 80 after the environment-friendly vehicle is stopped. When the environment-friendly vehicle is completely stopped by performing minimum-risk maneuver (MRM) control of the environment-friendly vehicle, the IEB controller 130 may be configured to operate the EPB 80 for the stability of the environment-friendly vehicle.

The HDP controller 150 may be configured to request the cluster 400 installed in the environment-friendly vehicle to output a warning message to a driver. The HDP controller 150 may be configured to operate the cluster 400 to provide a notification to the driver of the current situation of the environment-friendly vehicle. For example, when a collision between the preceding vehicle and the environment-friendly vehicle is expected, the cluster 400 may be configured to output a warning message to the driver. The HDP controller 150 may be configured to operate an emergency light and a horn of the environment-friendly vehicle to allow nearby vehicles to recognize the failure of the environment-friendly vehicle.

Figure 2:
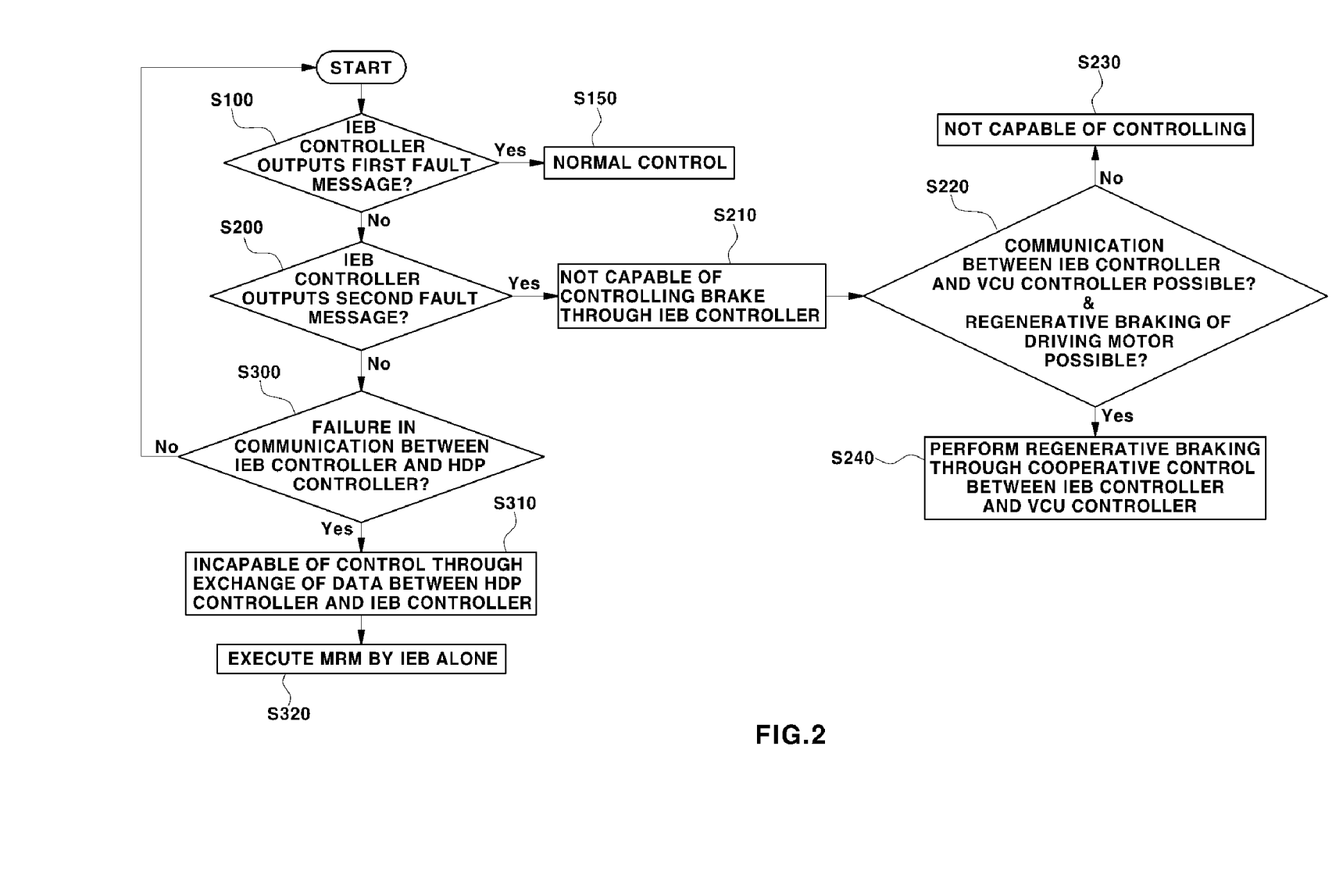
FIG. 2 is a diagram of a method of controlling a failure of an environment-friendly vehicle by an integrated electric booster (IEB) controller according to an embodiment of the present disclosure.
Figure 3:
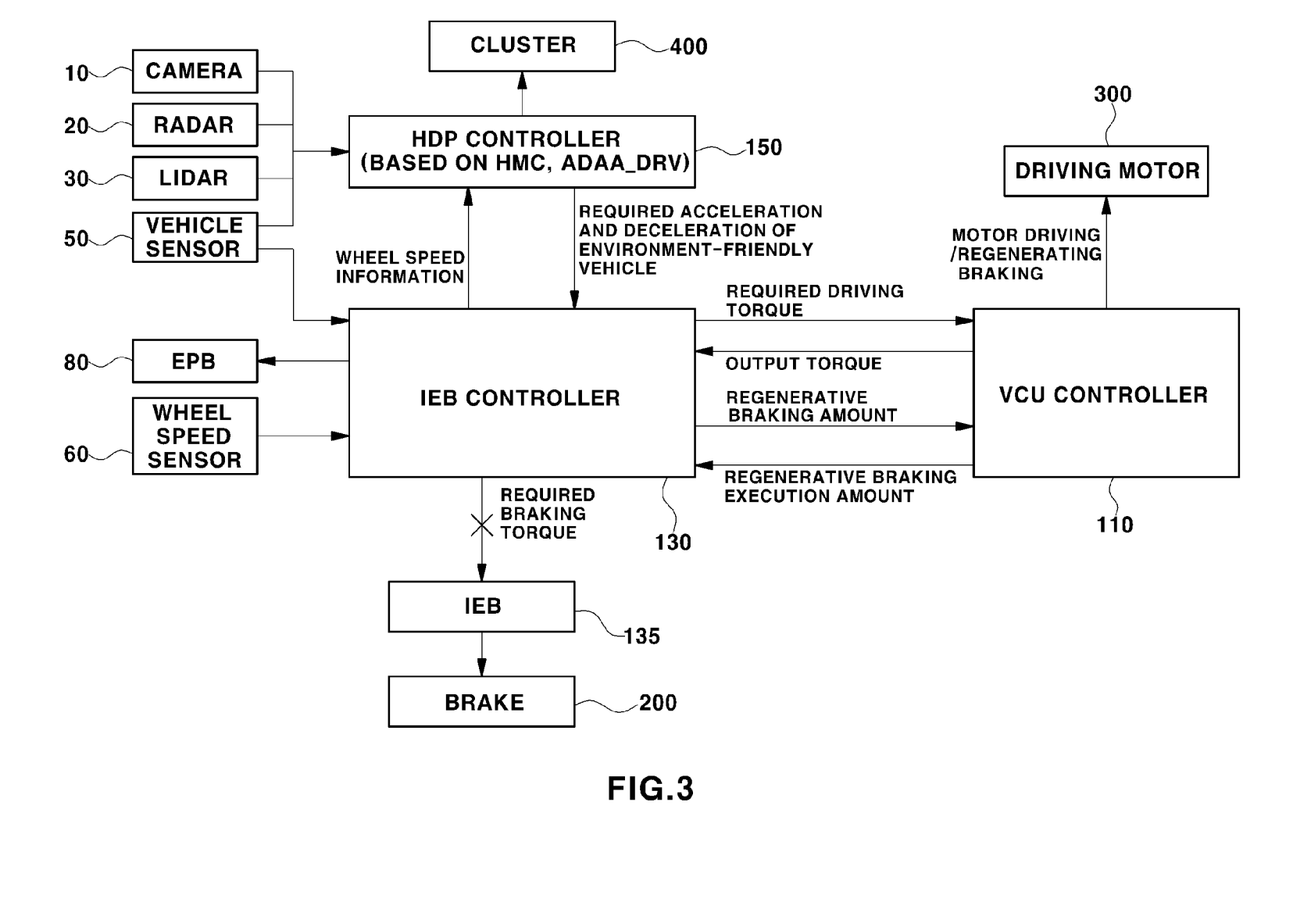
FIG. 3 is a diagram showing a method of controlling a failure of an environment-friendly vehicle in the case of an IEB failure according to an embodiment of the present disclosure.

FIG. 2 is a diagram of a method of controlling a failure of an environment-friendly vehicle by an IEB controller according to an embodiment of the present disclosure. FIG. 3 is a diagram showing a method of controlling a failure of an environment-friendly vehicle in the case of an IEB failure according to an embodiment of the present disclosure.

Referring to FIGS. 2 and 3, the IEB controller 130 may be configured to output a fault message to the HDP controller 150. The fault message may be a first fault message indicating that a failure occurs in the vehicle sensor 50 and the wheel-speed sensor 60, which transmit data to the IEB controller 130, or a second fault message indicating a type of failure in which it becomes impossible to control the brake 200. The IEB controller 130 may be configured to determine a type of failure related to the IEB 135 based on the type of the fault message transmitted to the HDP controller 150. In other words, the second fault message may be a message indicating a failure of the IEB 135 and a failure of the brake 200 (S100).

When the fault message output by the IEB controller 130 is the first fault message, it may be possible to perform longitudinal braking control according to the requirements of the HDP controller 150 and acceleration control and regenerative braking through the VCU controller 110. In other words, autonomous driving of the environment-friendly vehicle may be performed normally (S150). Then, the IEB controller 130 may be configured to determine whether the output fault message is the second fault message (S200).

When the fault message output by the IEB controller 130 is the second fault message, it may be impossible to control the brake 200 through the IEB controller 130. Accordingly, even if the HDP controller 150 transmits the required deceleration for braking of the environment-friendly vehicle to the IEB controller 130, the IEB controller 130 may not generate braking force corresponding to the required deceleration. Accordingly, the braking force corresponding to the required deceleration of the environment-friendly vehicle needs to be generated through cooperative control between the IEB controller 130 and the VCU controller 110. In particular, the HDP controller 150 may be configured to fix the required deceleration of the environment-friendly vehicle to a specific deceleration for minimum-risk maneuver (MRM) control. For example, the specific deceleration may be about −4 m/s². However, when determining the risk of collision between the environment-friendly vehicle and the preceding vehicle as the result of analysis of the distance between the environment-friendly vehicle and the preceding vehicle, the relative speed between the environment-friendly vehicle and the preceding vehicle, and the like, the HDP controller 150 may be configured to change the required deceleration of the environment-friendly vehicle to a larger deceleration than the specific deceleration (S210).

To determine whether it is possible to perform regenerative braking of the driving motor 300 by cooperative control between the IEB controller 130 and the VCU controller 110, whether it is possible for the IEB controller 130 and the VCU controller 110 to communicate with each other and whether it is possible to perform regenerative braking of the driving motor 300 may be determined. In particular, the IEB controller 130 may be configured to check whether it is possible for the IEB controller 130 and the VCU controller 110 to communicate with each other, and the VCU controller 110 may be configured to check whether it is possible to perform regenerative braking through the driving motor 300. For example, the case in which it is impossible to perform regenerative braking through the driving motor 300 may include the case in which a State of Charge (SoC) of a high-voltage battery (not shown) for supplying power to the driving motor 300 is equal to or greater than a preset level, and the case in which a failure occurs in the driving motor 300. For example, the present level may be close to a charge level corresponding to the fully charged state of the high-voltage battery (not shown) (S220).

When it is impossible for the IEB controller 130 and the VCU controller 110 to communicate with each other or it is impossible to perform regenerative braking through the driving motor 300, the IEB controller 130 may not perform minimum-risk maneuver (MRM) control of the environment-friendly vehicle. However, the stability of the environment-friendly vehicle may be ensured through minimum-risk maneuver (MRM) control through the HDP controller 150, which will be described below (S230).

In response to determining that it is possible for the IEB controller 130 and the VCU controller 110 to communicate with each other and it is possible to perform regenerative braking of the driving motor 300, regenerative braking of the driving motor 300 may be performed through cooperative control between the IEB controller 130 and the VCU controller 110. The IEB controller 130 may be configured to calculate the regenerative braking amount of the driving motor 300 based on the required deceleration of the vehicle, received from the HDP controller 150. In particular, the IEB controller 130 may be configured to transmit a required driving torque having a value "0" to the VCU controller 110.

In other words, deceleration through braking is required, and thus the IEB controller 130 may be configured to transmit a signal for performing regenerative braking instead of driving of the driving motor 300 to the VCU controller 110. The VCU controller 110 may be configured to perform regenerative braking based on the regenerative braking amount of the driving motor 300, calculated by the IEB controller 130. The required braking force of the environment-friendly vehicle may be satisfied by regenerative braking, and the environment-friendly vehicle may be moved to a safe area or may be stopped. When the environment-friendly vehicle is completely stopped through regenerative braking by the driving motor 300, the IEB controller 130 may be configured to operate the EPB 80 (S240).

The IEB controller 130 may be configured to determine whether a failure occurs in communication between the IEB controller 130 and the HDP controller 150. The IEB controller 130 may not output a fault message, but a failure may occur in communication between the IEB controller 130 and the HDP controller 150. If a failure does not occur in communication between the IEB controller 130 and the HDP controller 150, the environment-friendly vehicle may be operated normally (S300).

When a failure occurs in communication between the IEB controller 130 and the HDP controller 150, the IEB controller 130 may not be capable of controlling the brake 200 through exchange of data between the IEB controller 130 and the HDP controller 150. In general, the HDP controller 150 may be configured to transmit the required deceleration of the environment-friendly vehicle to the IEB controller 130, and the IEB controller 130 may be configured to calculate a required braking torque based on the required deceleration of the environment-friendly vehicle and operate the brake 200. However, when a failure occurs in communication between the IEB controller 130 and the HDP controller 150, the IEB controller 130 may become unable to control the brake 200 or the IEB 135 through exchange of data between the IEB controller 130 and the HDP controller 150 (S310).

Accordingly, the IEB controller 130 may be configured to perform braking of the environment-friendly vehicle through the brake 200 based on the preset braking amount. For example, the preset braking amount may be a value that is predetermined without consideration of a nearby situation and a driving state of the environment-friendly vehicle and may be a braking amount for performing longitudinal deceleration control of the environment-friendly vehicle at a specific deceleration. In other words, the IEB controller 130 may not output a fault message, but when a failure occurs in communication between the IEB controller 130 and the HDP controller 150, the IEB controller 130 may be configured to operate the brake 200 based on a preset braking amount (S320).

According to an embodiment of the present disclosure, the strategy for braking of the environment-friendly vehicle may be changed based on the type of failure of the IEB 135 and a failure in communication between the IEB controller 130 and the HDP controller 150. When a failure occurs in communication with the HDP controller 150, the IEB controller 130 may be configured to directly operate the brake 200, and may thus enable the environment-friendly vehicle to brake. When a failure occurs in the brake 200 and the IEB 135, the IEB controller 130 may be configured to perform regenerative braking through cooperative control with the VCU controller 110, and may thus enable the environment-friendly vehicle to brake by regenerative braking. As a result, even in the event of various fault situations, the IEB controller 130 may be configured to perform braking of the environment-friendly vehicle and may ensure the stability of the vehicle.

Figure 4:
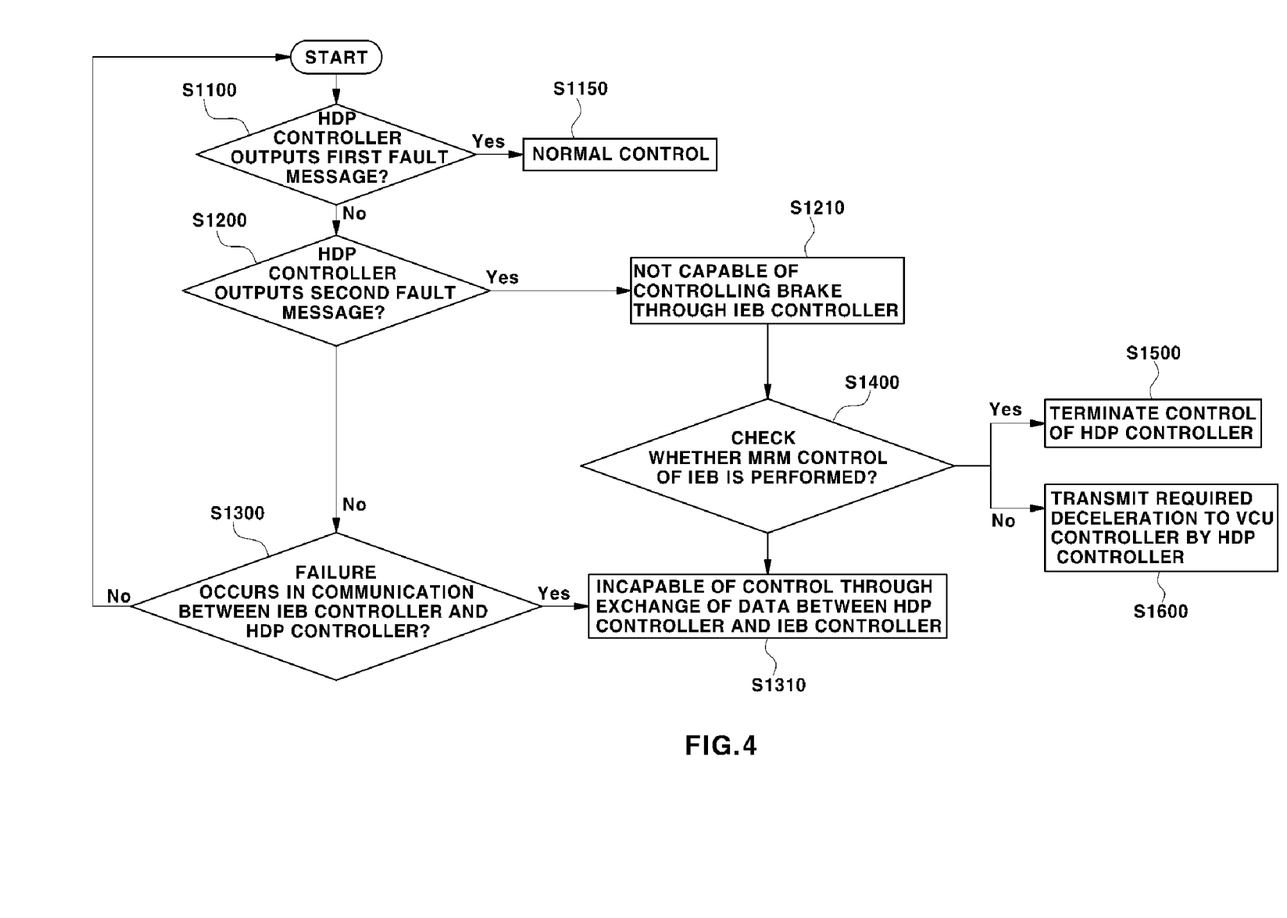
FIG. 4 is a diagram of a method of controlling a failure of an environment-friendly vehicle by a highway driving pilot (HDP) controller according to an embodiment of the present disclosure.
Figure 5:
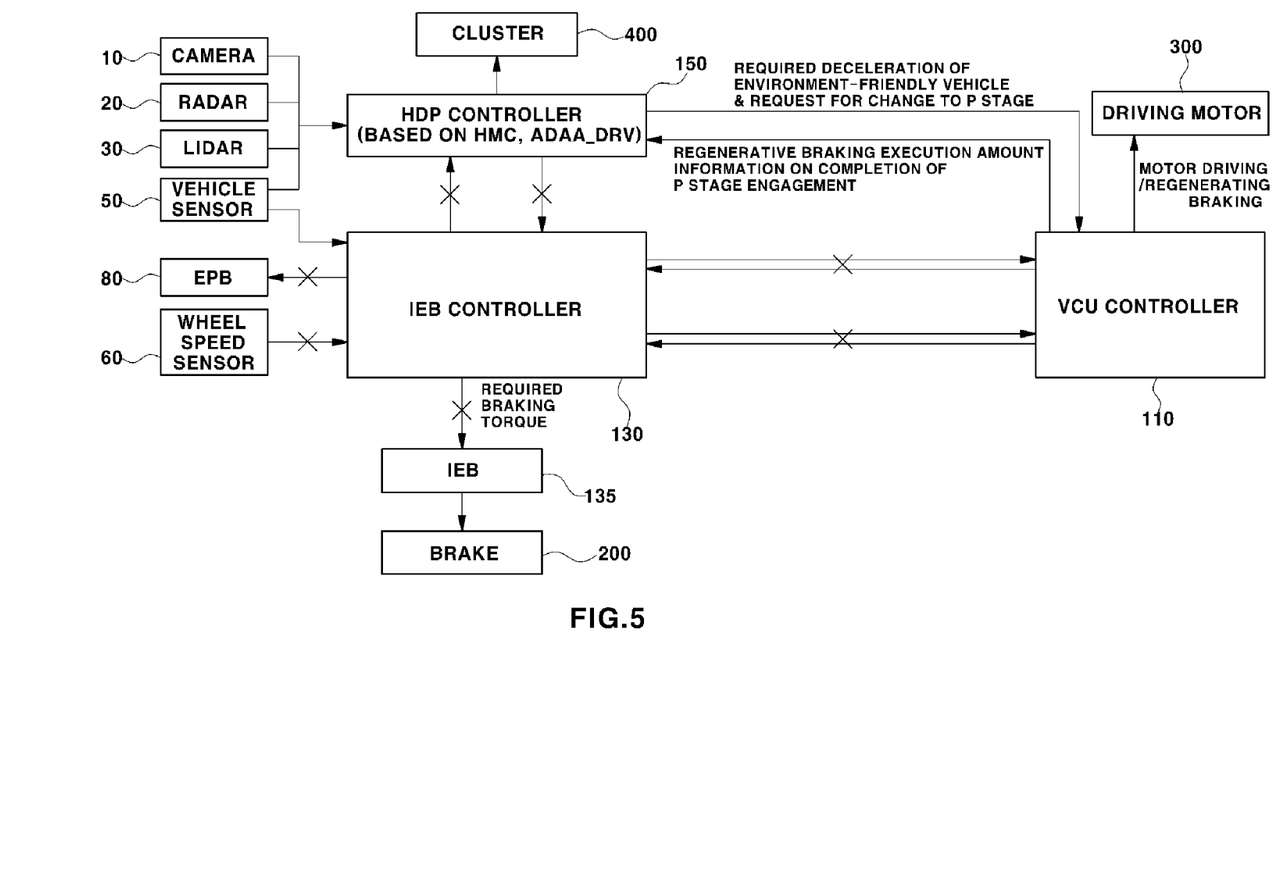
FIG. 5 is a diagram of a method of controlling a failure of an environment-friendly vehicle when a failure occurs in communication between an IEB controller and an HDP controller according to an embodiment of the present disclosure.

FIG. 4 is a diagram of a method of controlling a failure of an environment-friendly vehicle by an HDP controller according to an embodiment of the present disclosure. FIG. 5 is a diagram of a method of controlling a failure of an environment-friendly vehicle when a failure occurs in communication between an IEB controller and an HDP controller according to an embodiment of the present disclosure.

Referring to FIGS. 4 and 5, the IEB controller 130 may be configured to output a fault message to the HDP controller 150. The fault message may include a first fault message indicating that a failure occurs in the vehicle sensor 50 and the wheel-speed sensor 60, which transmit data to the IEB controller 130, and a second fault message indicating a type of failure in which it becomes impossible to control the brake 200. The HDP controller 150 may be configured to determine the type of failure related to the IEB 135 based on a type of the fault message received from the IEB controller 130. In other words, the second fault message may be a message indicating a failure of the IEB 135 and a failure of the brake 200 (S1100).

When the fault message received by the HDP controller 150 is the first fault message, it may be possible to perform longitudinal braking control according to requirements of the HDP controller 150 and acceleration control and regenerative braking through the VCU controller 110. In other words, autonomous driving of the environment-friendly vehicle may be performed normally (S1150).

Then, the HDP controller 150 may be configured to determine whether the received fault message is the second fault message (S1200). When the fault message received by the HDP controller 150 is the second fault message, the IEB controller 130 may be determined to be incapable of operating the brake 200 based on the data received from the HDP controller 150. Accordingly, even if the HDP controller 150 transmits the required deceleration for braking of the environment-friendly vehicle to the IEB controller 130, the IEB controller 130 may not generate braking force corresponding to the required deceleration. Accordingly, the braking force corresponding to the required deceleration of the environment-friendly vehicle needs to be generated through cooperative control between the IEB controller 130 and the VCU controller 110.

In particular, the HDP controller 150 may fix the required deceleration of the environment-friendly vehicle to a specific deceleration for minimum-risk maneuver (MRM) control. For example, the specific deceleration may be about −4 m/s$^2$. However, when determining the risk of a collision between the environment-friendly vehicle and the preceding vehicle as the result of analysis of the distance between the environment-friendly vehicle and the preceding vehicle, the relative speed between the environment-friendly vehicle and the preceding vehicle, and the like, the HDP controller 150 may be configured to change the required deceleration of the environment-friendly vehicle to a greater deceleration than the specific deceleration (S1210)

The HDP controller 150 may be configured to determine whether a failure occurs in communication between the IEB controller 130 and the HDP controller 150. The IEB controller 130 may not output a fault message, but a failure may occur in communication between the IEB controller 130 and the HDP controller 150. If a failure does not occur in communication between the IEB controller 130 and the HDP controller 150, the environment-friendly vehicle may be controlled normally (S1300).

When a failure occurs in communication between the IEB controller 130 and the HDP controller 150, the IEB controller 130 may be incapable of operating the brake 200 through exchange of data between the IEB controller 130 and the HDP controller 150. In general, the HDP controller 150 may be configured to transmit the required deceleration of the environment-friendly vehicle to the IEB controller 130, and the IEB controller 130 may be configured to calculate a required braking torque based on the required deceleration of the environment-friendly vehicle and operate the brake 200. However, when a failure occurs in communication between the IEB controller 130 and the HDP controller 150, the IEB controller 130 may become incapable of controlling the brake 200 or the IEB 135 due to inability to exchange data between the IEB controller 130 and the HDP controller 150 (S1310).

The HDP controller 150 may be configured to determine whether minimum-risk maneuver (MRM) control is performed normally (e.g., without failure or malfunction) through the IEB 135. Whether minimum-risk maneuver (MRM) control is performed normally may be determined based on whether the environment-friendly vehicle is decelerating and the rate of deceleration of the environment-friendly vehicle (S1400). The HDP controller 150 may not be capable of directly controlling the IEB 135 and the brake 200, and thus may control regenerative braking by the driving motor 300 through the VCU controller 110. When minimum-risk maneuver (MRM) control is performed normally, the HDP controller 150 may not perform additional control (S1500).

However, when minimum-risk maneuver (MRM) control is not performed normally, the HDP controller 150 may be configured to transmit the required deceleration of the environment-friendly vehicle to the VCU controller 110. The VCU controller 110, having received the required deceleration of the environment-friendly vehicle, may be configured to calculate a regenerative braking amount that satisfies the required deceleration and operate the driving motor 300 to perform regenerative braking based on the regenerative braking amount. The required braking force of the environment-friendly vehicle may be provided through regenerative braking, and the environment-friendly vehicle may be moved to a safe area, or may be stopped. In particular, the required braking force may be the braking force corresponding to the required deceleration of the environment-friendly vehicle, determined by the HDP controller 150.

When the environment-friendly vehicle is completely stopped through regenerative braking of the driving motor 300, the HDP controller 150 may be configured to request the VCU controller 110 to shift a gear stage to a P stage. When the gear stage is shifted to the P stage, the VCU controller 110 may be configured to transmit a signal, indicating that shifting to the P stage is completed, to the HDP controller 150. In response to receiving the signal indicating that the gear stage is shifted to the park (P) stage, the HDP controller 150 may be configured to stop transmitting the required deceleration to the VCU controller 110 (S1600).

According to an embodiment of the present disclosure, the strategy for braking the environment-friendly vehicle may be changed based on the type of failure of the IEB 135 and a failure in communication between the IEB controller 130 and the HDP controller 150. When a failure occurs in the IEB 135 or the brake 200 and a failure occurs in communication with the IEB controller 130, the HDP controller 150 may be configured to directly transmit the required deceleration to the VCU controller 110 and operate the VCU controller 110 to perform regenerative braking of the driving motor 300. As a result, even in the event of various fault situations, the HDP controller 150 may be configured to perform braking of the environment-friendly vehicle and may ensure the stability of the vehicle.

Figure 6:
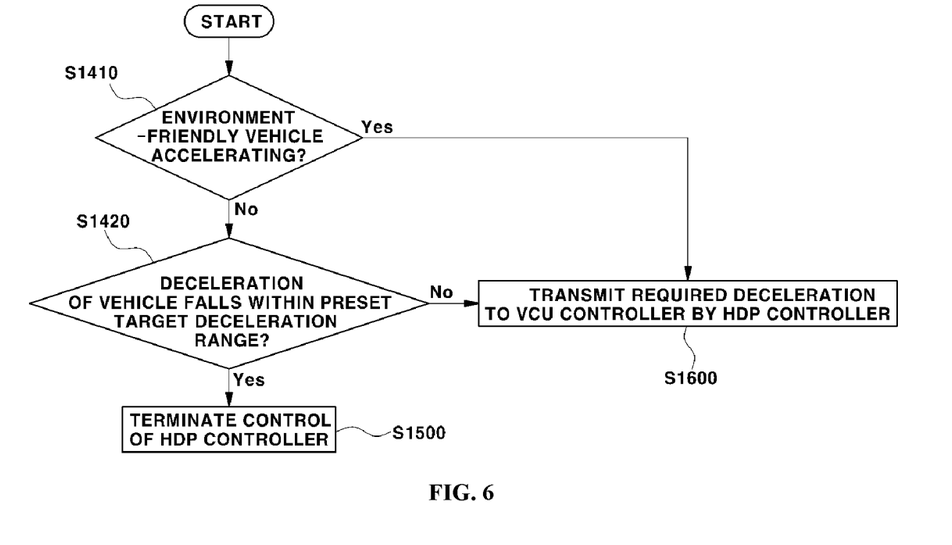
FIG. 6 is a diagram showing a method of determining whether to perform minimum-risk maneuver (MRM) control of IEB according to an embodiment of the present disclosure.

FIG. 6 is a diagram showing a method of determining whether to perform minimum-risk maneuver (MRM) control of IEB according to an embodiment of the present disclosure. Referring to FIGS. 3 to 6, the HDP controller 150 may be configured to determine whether an environment-friendly vehicle decelerates based on an acceleration and deceleration of the environment-friendly vehicle, acquired through an acceleration sensor. If the environment-friendly vehicle accelerates, the HDP controller 150 may be configured to determine that minimum-risk maneuver (MRM) control through the IEB 135 is not being performed normally (S1410).

If the environment-friendly vehicle decelerates, the HDP controller 150 may be configured to determine whether the deceleration of the environment-friendly vehicle falls within a preset target deceleration range. When the deceleration of the environment-friendly vehicle is outside the preset target deceleration range, the HDP controller 150 may be configured to determine that minimum-risk maneuver (MRM) control through the IEB 135 is not performed normally (S1420).

When the deceleration of the environment-friendly vehicle is within the preset range of the target deceleration, the HDP controller 150 may be configured to determine that minimum-risk maneuver (MRM) control through the IEB 135 is performed normally. Accordingly, the HDP controller 150 may not perform additional control for braking of the environment-friendly vehicle (S1500). In response to determining that the deceleration of the environment-friendly vehicle is outside the preset target deceleration range, the HDP controller 150 may be configured to transmit the required deceleration of the environment-friendly vehicle to the VCU controller 110. The VCU controller 110, having received the required deceleration of the environment-friendly vehicle, may be configured to calculate a regenerative braking amount that satisfies the required deceleration, and operate the driving motor 300 to perform regenerative braking based on the regenerative braking amount (S1600).

According to an embodiment of the present disclosure, the strategy for braking of the environment-friendly vehicle may be changed based on the type of failure of IEB and a failure in communication between the IEB controller and the HDP controller. When a failure occurs in communication with the HDP controller, the IEB controller may be configured to directly operate a brake to enable the environment-friendly vehicle to brake. When a failure occurs in the brake and the IEB, the IEB controller may be configured to perform regenerative braking through cooperative control with the VCU controller, and the environment-friendly vehicle may brake by regenerative braking. As a result, even in the event of various fault situations, the IEB controller may remain able to perform braking of the environment-friendly vehicle, and may ensure the stability of the vehicle.

According to an embodiment of the present disclosure, when a failure occurs in the IEB or the brake and a failure occurs in communication with the IEB controller, the HDP controller may be configured to directly transmit the required deceleration to the VCU controller, and operate the VCU controller perform regenerative braking using the driving motor. In other words, when it is impossible to control the brake through the IEB controller, the HDP controller may be configured to also perform regenerative braking of the environment-friendly vehicle, whereby the stability of the vehicle may be ensured.

The present disclosure has been described in detail with reference to exemplary embodiments thereof. However, it will be appreciated by those skilled in the art that changes may be made in these embodiments without departing from the principles and spirit of the present disclosure, the scope of which is defined in the appended claims and their equivalents.

What is claimed is:

1. A system for controlling a failure of an environment-friendly vehicle, the system comprising:
a vehicle control unit (VCU) controller configured to operate a driving motor;
an integrated electric booster (IEB) controller configured to operate an IEB for controlling a brake of the environment-friendly vehicle and generate a request to the VCU controller for regenerative braking; and
a highway driving pilot (HDP) controller configured to calculate a required deceleration of the environment-friendly vehicle based on a situation around the environment-friendly vehicle, determined through cognitive control sensors installed in the environment-friendly vehicle, and to transmit the required deceleration to the IEB controller,
wherein at least one of regenerative braking of the driving motor or braking through the brake is performed based on a type of a fault message output by the IEB controller or a failure in communication between the HDP controller and the IEB controller,
wherein the HDP controller is configured to determine a type of failure of the IEB based on the type of the fault message received from the IEB controller,
wherein the IEB controller is configured to determine the type of failure of the IEB based on the type of the fault message transmitted to the HDP controller,
wherein if the HDP controller determines a failure in which it is impossible to control the brake or the failure in communication between the HDP controller and the IEB controller, the HDP controller is configured to determine whether to perform minimum-risk maneuver (MRM) control for minimizing risk of driving of the environment-friendly vehicle of the IEB based on a deceleration of the environment-friendly vehicle, and
wherein if the IEB controller determines the failure in which it is impossible to control the brake or the failure in communication between the HDP controller and the IEB controller, the IEB controller is configured to perform the MRM control.

2. The system of claim 1, wherein:
the IEB controller is configured to transmit the fault message to the HDP controller;
the fault message includes a first fault message, indicating that a failure occurs in a vehicle sensor that transmits data to the IEB controller, and a second fault message, indicating a type of failure in which it becomes impossible to control the brake; and
the vehicle sensor includes a yaw rate sensor, a wheel speed sensor, and an acceleration sensor.

3. The system of claim 2, wherein, when the IEB controller outputs the first fault message, the IEB controller is configured to transmit a regenerative braking amount of the driving motor, derived based on the required deceleration, to the VCU controller and operate the IEB to control the brake.

4. The system of claim 2, wherein, when the IEB controller outputs the second fault message, the IEB controller is configured to check whether it is possible for the IEB controller and the VCU controller to communicate with each other, and the VCU controller is configured to check whether it is possible to perform regenerative braking through the driving motor.

5. The system of claim 4, wherein, in response to determining that it is possible for the IEB controller and the VCU controller to communicate with each other and it is possible to perform regenerative braking through the driving motor, the IEB controller is configured to transmit a regenerative braking amount of the driving motor, derived based on the required deceleration, to the VCU controller.

6. The system of claim 5, wherein, after the environment-friendly vehicle is stopped, the IEB controller is configured to operate an electric parking brake (EPB).

7. The system of claim 1, wherein if the HDP controller confirms that the IEB controller performs the MRM control, the HDP controller does not perform additional control.

8. The system of claim 1, wherein if the HDP controller confirms that the IEB controller does not perform the MRM control, the HDP controller performs the MRM control.

9. The system of claim 1, wherein the HDP controller is configured to fix the required deceleration to a specific deceleration.

10. The system of claim 1, wherein the HDP controller is configured to request a cluster installed in the environment-friendly vehicle to output a warning message to a driver.

11. The system of claim 1, wherein:
the HDP controller is configured to determine whether the environment-friendly vehicle decelerates or accelerates using an acceleration sensor applied to the environment-friendly vehicle; and
in response to determining that the environment-friendly vehicle accelerates or the deceleration of the environment-friendly vehicle is outside a preset range, the HDP controller is configured to directly transmit the required deceleration to the VCU controller.

12. The system of claim 11, wherein, when the deceleration of the environment-friendly vehicle is within the preset range, the HDP controller is configured to recognize that control of braking of the environment-friendly vehicle is performed by at least one of the IEB controller or the VCU controller.

13. The system of claim 11, wherein the VCU controller is configured to calculate a regenerative braking amount of the driving motor based on the required deceleration received from the HDP controller and operate the driving motor based on the calculated regenerative braking amount.

14. The system of claim 13, wherein:
the HDP controller is configured to determine whether the environment-friendly vehicle is stopped based on the deceleration of the environment-friendly vehicle, acquired through the acceleration sensor; and
the HDP controller is configured to request the VCU controller to shift a gear stage to a P stage when the environment-friendly vehicle is stopped.

15. The system of claim 14, wherein, in response to receiving a signal indicating that the gear stage is shifted to the P stage, the HDP controller is configured to stop transmitting the required deceleration to the VCU controller.

* * * * *